(12) United States Patent
Fisher (10) Patent No.: US 7,212,826 B2
(45) Date of Patent: *May 1, 2007

(54) METHOD FOR IMPLEMENTING FAST DYNAMIC CHANNEL ALLOCATION ESCAPE MECHANISM IN RADIO RESOURCE MANAGEMENT

(75) Inventor: Xiaochun Xu Fisher, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 492 days.

This patent is subject to a terminal disclaimer.

(21) Appl. No.: 10/747,733

(22) Filed: Dec. 29, 2003

(65) Prior Publication Data

US 2004/0255285 A1    Dec. 16, 2004

Related U.S. Application Data

(60) Provisional application No. 60/450,793, filed on Feb. 27, 2003.

(51) Int. Cl.
*H04Q 7/20* (2006.01)
(52) U.S. Cl. ............... 455/452.2; 455/452.2; 455/450; 370/328; 370/332; 370/458
(58) Field of Classification Search ............ 455/450, 455/451, 452.1, 452.2, 412.1, 464, 414.1, 455/509, 512, 513, 63.1, 67.11, 67.13; 370/230, 370/235, 280, 241.1, 331, 335, 337, 345, 370/328, 329
See application file for complete search history.

(56) References Cited

U.S. PATENT DOCUMENTS 5,359,596 A    10/1994  Sadiq

| | | |
|---|---|---|
| 6,473,442 B1 | 10/2002 | Lundsjö et al. |
| 6,487,415 B1 | 11/2002 | Eibling et al. |
| 6,791,961 B2 | 9/2004 | Zeira et al. |
| 2001/0036823 A1 | 11/2001 | Van Lieshout et al. |
| 2001/0038623 A1 | 11/2001 | Van Lieshout et al. |
| 2002/0003782 A1 | 1/2002 | Pan et al. |
| 2002/0009061 A1 | 1/2002 | Willenegger |
| 2002/0094817 A1 | 7/2002 | Rune et al. |
| 2002/0119783 A1 | 8/2002 | Bourlas et al. |
| 2002/0119796 A1 | 8/2002 | Vanghi |
| 2003/0123388 A1 | 7/2003 | Bradd |
| 2004/0214582 A1 | 10/2004 | Lan et al. |
| 2005/0148337 A1 | 7/2005 | Karlsson et al. |
| 2005/0190729 A1 | 9/2005 | Roy et al. |

*Primary Examiner*—Jean Gelin
(74) *Attorney, Agent, or Firm*—Volpe and Koenig, P.C.

(57) ABSTRACT

A method of implementing a fast dynamic channel allocation escape procedure in a wireless communication system includes a pre-code allocation procedure, a signal-independent code allocation procedure, and a post-code allocation procedure. The pre-code allocation procedure receives and processes a measurement trigger signal, retrieves system measurements from a centralized database, and determines physical resources to be reassigned. The code allocation procedure checks the availability of a code set in the cell and generates timeslot sequences for the available timeslots. A code set is assigned to the available timeslots in a timeslot sequence, wherein a successful assignment is a solution. The interference signal code power (ISCP) is calculated for each solution and the solution having the lowest weighted ISCP is selected as an optimal solution. The post-code allocation procedure stores the reallocation information in the centralized database and creates a physical channel reconfiguration request message.

27 Claims, 5 Drawing Sheets

METHOD FOR IMPLEMENTING FAST DYNAMIC CHANNEL ALLOCATION ESCAPE MECHANISM IN RADIO RESOURCE MANAGEMENT

CROSS REFERENCE TO RELATED APPLICATIONS

This application claims priority from U.S. Provisional Application No. 60/450,793, filed Feb. 27, 2003, which is incorporated by reference as if fully set forth herein.

FIELD OF THE INVENTION

The present invention relates generally to radio resource management in wireless communication systems, and more particularly to an implementation of a fast dynamic channel allocation (F-DCA) escape mechanism in radio resource management (RRM).

BACKGROUND OF THE INVENTION

In wireless communication systems, RRM is generally responsible for utilizing the air interface resources. RRM is used to guarantee quality of service (QoS), to provide efficient use of the radio resources, and to increase system capacity. RRM consists of admission control, handover, power control, and congestion control functionalities. Admission control can be divided into user admission control and call admission control (CAC). User admission control accepts or rejects the radio resource control (RRC) connection requested by a wireless transmit/receive unit (WTRU). Call admission control accepts or rejects a request to establish or modify a radio access bearer (RAB) in the radio access network (RAN). Call admission control is located in the controlling radio network controller (C-RNC).

There are two dynamic channel allocation (DCA) functions, slow DCA and fast DCA (S-DCA, F-DCA). The S-DCA allocates the radio resources to cells while the F-DCA allocates the radio resources to bearer service. Two F-DCA functions, which could be in the form of algorithms, are executed by RRM at steady state operation: one for background interference reduction and one for an escape mechanism.

The F-DCA escape mechanism is used to solve a link problem of a user. It is used as an escape mechanism for a specific user (or part of user services) or a base station that experiences high interference or that cannot satisfy QoS by reassigning the radio resources to an existing radio bearer. The F-DCA escape mechanism runs in a cell for all WTRUs in steady state with real time (RT) services. It does not apply to non-real time (NRT) services.

Only one F-DCA function is preferably run at a given time in a C-RNC, because the output of one function may affect the decision of another function. If more than one of these functions are triggered at exactly the same time, the priority of these functions is such that the escape mechanism runs first, CAC runs second, and the background interference reduction algorithm runs last.

It is desirable to provide an improved escape mechanism, which satisfies the foregoing requirements.

SUMMARY OF THE INVENTION

The present invention provides a method for implementing the F-DCA escape mechanism in RRM, which increases system efficiency by functioning as follows. The F-DCA escape mechanism is triggered by RRM for a specific uplink or downlink coded composite transport channel (CCTrCH) of a WTRU when one of the following three conditions is met:

1) The downlink timeslot interference signal code power (DL timeslot ISCP) measured by a WTRU is greater than a threshold.

2) The uplink timeslot interference signal code power (UL timeslot ISCP) measured by a Node B is greater than a threshold. These two thresholds are design parameters, and can be the same value or can be different values.

3) The Node B reaches the maximum allowed transmitted power.

The present invention alters the previously implemented F-DCA algorithm such that the channel allocation function is modified and reused in the implementation of F-DCA escape mechanism. More specifically, certain functions in the previous implementation of the F-DCA CAC algorithm that are signal-dependent are altered to become signal-independent by the present invention, such that the altered functions are reusable in the implementation of the escape mechanism.

A method of implementing a fast-dynamic channel allocation escape procedure in a wireless communication system includes a pre-code allocation procedure, a signal-independent code allocation procedure, and a post-code allocation procedure. The pre-code allocation procedure receives a trigger signal, obtains wireless transmit/receive unit (WTRU) measurements and Node B measurements from an RRC shared cell database, obtains cell configuration information and WTRU information from a centralized database, determines the candidate CCTrCH to be reassigned, and determines the candidate code set to be reassigned. The code allocation procedure checks the code availability in the cell, checks the transmitted power of the candidate timeslot, checks if the ISCP of other timeslots is lower than that of the candidate timeslot, generates timeslot sequences for the available timeslots, assigns the candidate code set to the available timeslots in a timeslot sequence, wherein a successful assignment is a solution; calculates an interference signal code power (ISCP) for each solution; and selects the solution having the lowest weighted ISCP as an optimal solution. The post-code allocation procedure stores the reallocation information in the centralized database and creates a physical channel reconfiguration request message.

A method of implementing a fast dynamic channel allocation (F-DCA) escape mechanism in a wireless communication system begins by receiving and processing a trigger signal. WTRU and Node B measurements are retrieved from a centralized database and physical resources to be reassigned are determined. A code set is allocated to the available timeslots and the allocation information is stored in the centralized database. A physical channel reconfiguration request message is sent, containing the new allocation information for this WTRU.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF PREFERRED EMBODIMENT

Figure 1:
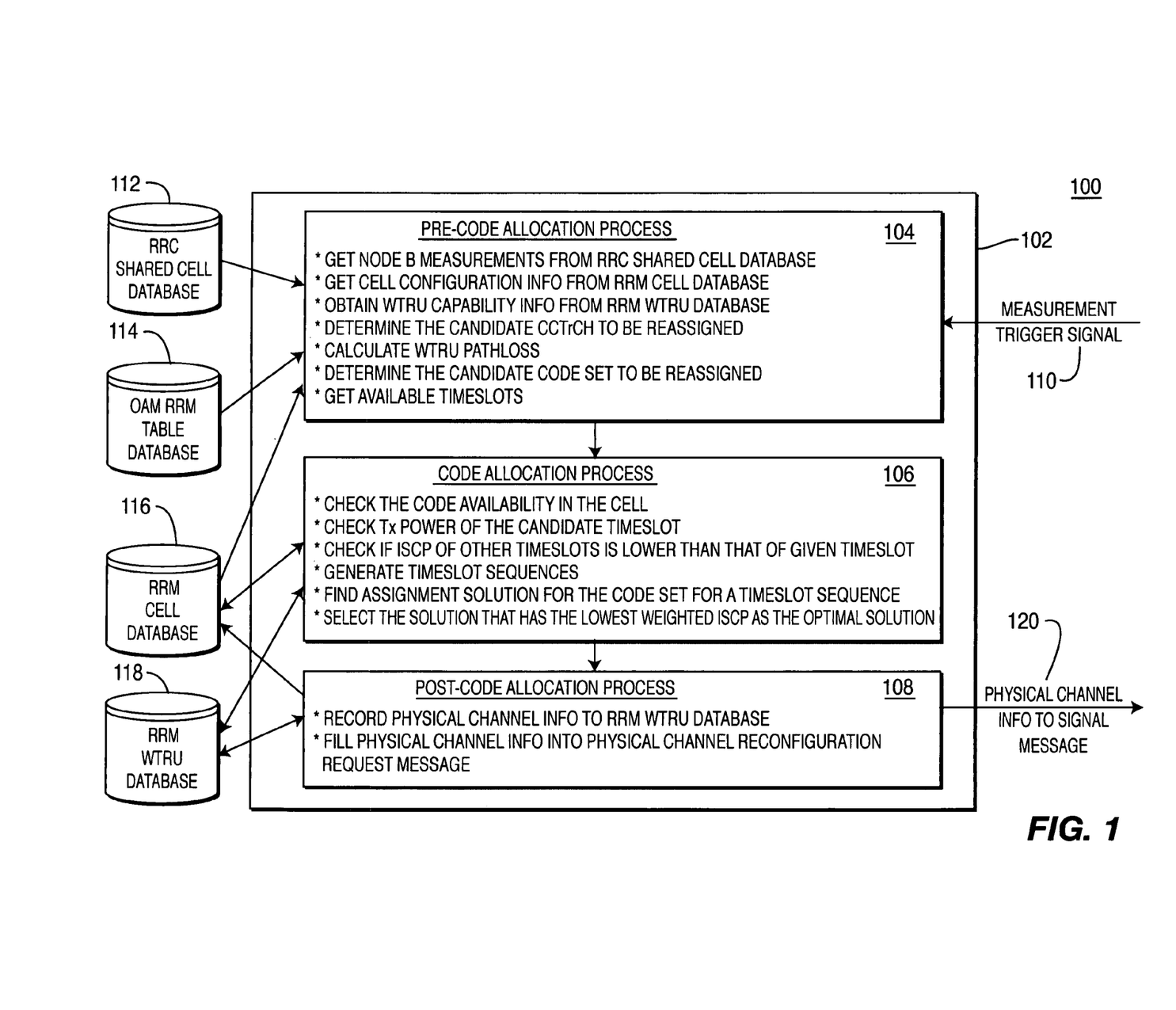
FIG. 1 is an overview of a F-DCA escape procedure in accordance with the present invention.

An overview 100 of the F-DCA escape procedure 102 is shown in FIG. 1. The main function of the F-DCA escape procedure 102 consists of three parts: the pre-code allocation process 104, the code allocation process 106, and the post-code allocation process 108. The pre-code allocation process 104 is started upon receipt of a measurement trigger signal 110. There are two measurement trigger signals, a WTRU measurement trigger signal and a Node B measurement trigger signal. The WTRU measurement trigger signal contains the WTRU identification and a list of timeslot numbers, while the Node B measurement trigger signal contains a timeslot number. The escape procedure begins upon receipt of either the WTRU measurement trigger signal or the Node B measurement trigger signal.

The pre-code allocation process 104 gets Node B measurements and WTRU measurements from a RRC shared cell database 112, gets cell configuration information from a RRM cell database 116, obtains WTRU capability information from a RRM WTRU database 118, determines the candidate coded composite transport channel (CCTrCH) to be reassigned, calculates the WTRU pathloss, determines the candidate code set to be reassigned, and obtains a list of the available timeslots. The pre-code allocation process 104 prepares the inputs for the code allocation process 106.

The code allocation process 106 checks the code availability in the cell, checks the transmission (Tx) power of the candidate timeslot, checks if the ISCP of other timeslots is lower than that of the candidate timeslot, generates timeslot sequences for the available timeslots, finds the assignment solution for the code set in a timeslot sequence (by assigning the candidate code set to the available timeslots), and selects the solution that has the lowest weighted ISCP as the optimal solution. The post-code allocation process 108 is responsible for recording the newly allocated physical channels in the RRM WTRU database 118 and filling the physical channel information into a physical channel reconfiguration request message 120.

In addition to the data exchanges between the processes and the databases, there are data exchanges occurring directly between the processes. The WTRU measurements, the Node B measurements, a list of available timeslots in the cell, a candidate code set, and WTRU capability information are passed from the pre-code allocation process 104 to the code allocation process 106. The physical channel information (a list of timeslots and channelized codes in each timeslot) are passed from the code allocation process 106 to the post-code allocation process 108.

In the present invention, the functions of the F-DCA escape algorithm 102 are modularized into two groups of functions: signal-dependent functions whose inputs are parts of signal messages and signal-independent functions whose inputs are independent of signal messages. The purpose of separating the signal-dependent functions and the signal-independent functions is to increase the reusability of the signal-independent functions. The functions of both the pre-code allocation process 104 and the post-code allocation process 108 are signal-dependent functions. In contrast, the functions of the code allocation process 106 are signal-independent functions. Therefore, the reusability of signal-independent functions is higher than that of the signal-dependent functions. Certain functions, which are inherently signal-dependent, are converted in the preferred embodiment of the present invention from being signal-dependent to signal-independent, thereby increasing the reusability of the converted functions.

Figure 2A:
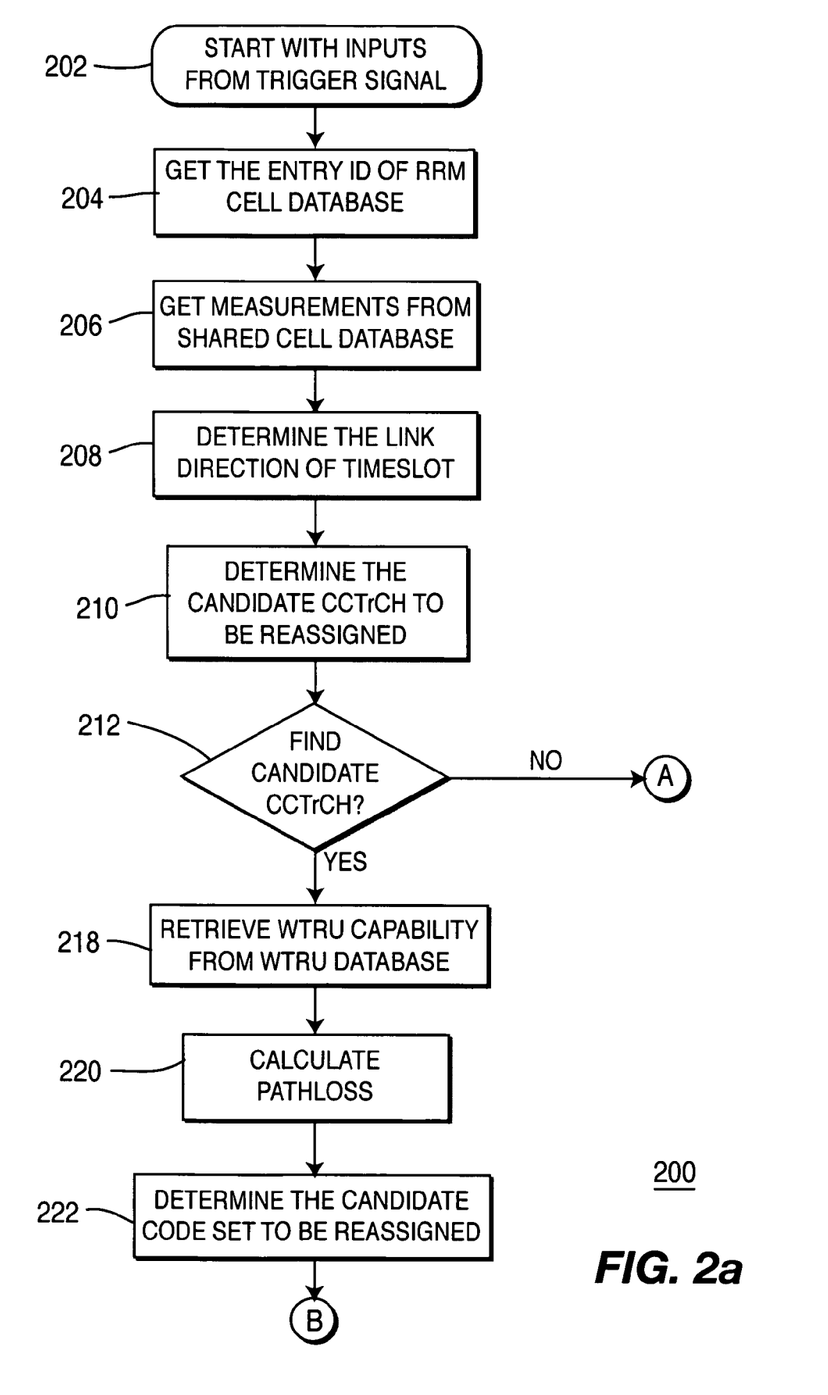
FIGS. 2a and 2b show a flowchart of the F-DCA escape procedure shown in FIG. 1.
Figure 2B:
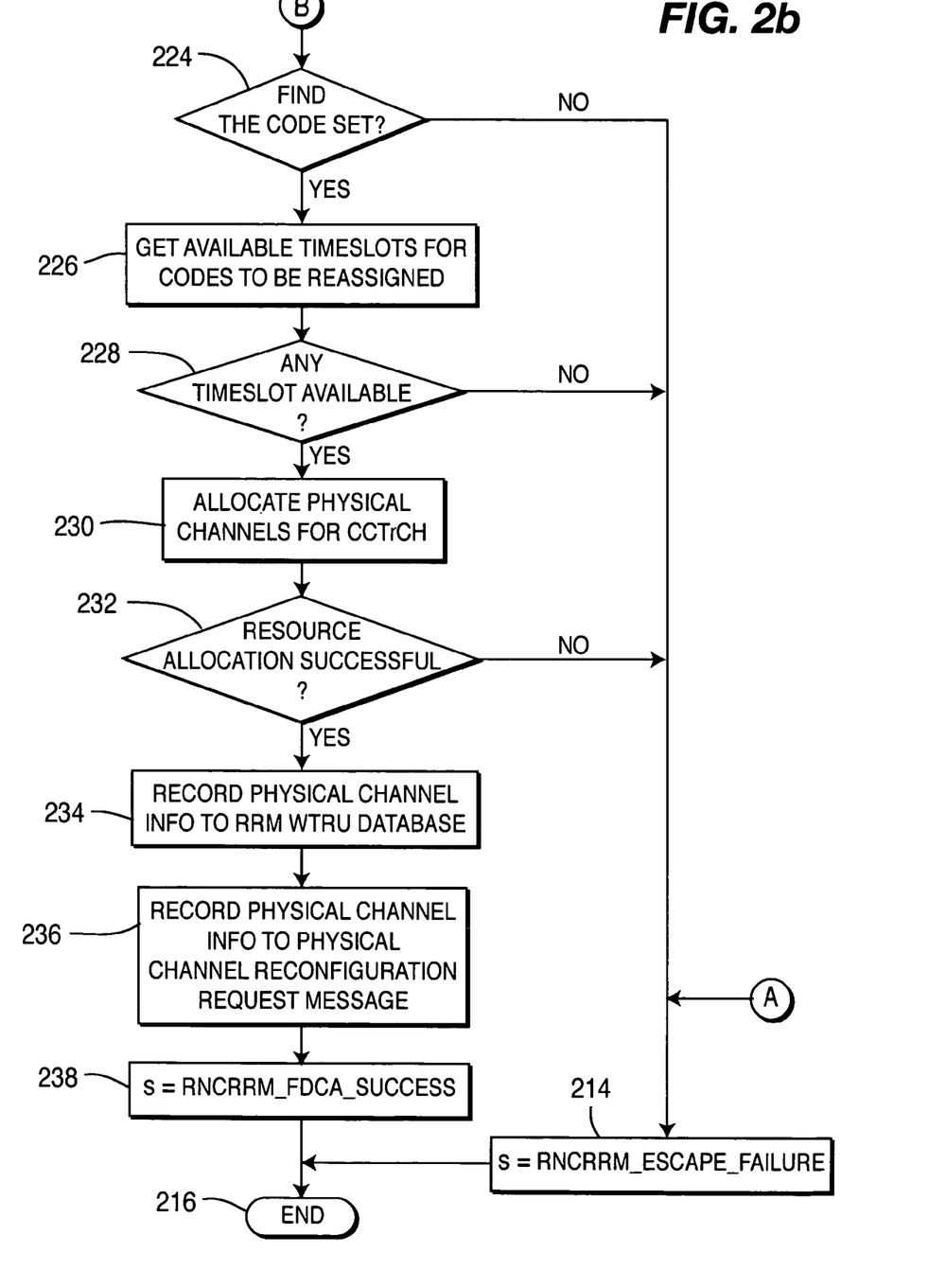

The flowcharts for functions of the F-DCA escape procedure are shown in FIGS. 2a, 2b, 3a, and 3b. FIGS. 2a and 2b show a flowchart of the main escape algorithm 200, which begins by receiving inputs from the trigger signals (step 202). The entry identification of the RRM cell database is retrieved from the RRM cell database (step 204). The WTRU measurements and the Node B measurements are retrieved from the shared cell database (step 206). The link direction of the timeslots that have a link problem is determined (step 208) and the timeslot that has the worst link problem is located.

A candidate CCTrCH to be reassigned is determined based on how the escape mechanism is triggered (step 210). When the escape procedure is triggered by a too high downlink (DL) ISCP of a WTRU in a timeslot, the CCTrCH of the WTRU in this timeslot is the candidate to be reassigned. The DL ISCP is measured by the WTRU, and in this case, the escape procedure is triggered by the WTRU measurement signal.

When the escape procedure is triggered by a too high uplink (UL) ISCP in a timeslot, the CCTrCH that has the code with the highest value of signal to interference ratio (SIR) plus pathloss is the candidate to be reassigned. When the escape procedure is triggered by a too high Node B transmitted carrier power, the CCTrCH that has the code with the highest Node B transmitted code power is the candidate to be reassigned. The UL ISCP and the Node B transmitted carrier power are both measured by the Node B, and in both of these cases, the escape procedure is triggered by the Node B measurement signal.

If no candidate CCTrCH is found (step 212), then a status flag is set to indicate a failure condition (step 214) and the procedure terminates (step 216).

If a candidate CCTrCH is found (step 212), then the WTRU capability information is retrieved from the RRM WTRU database (step 218). The pathloss of the WTRU is calculated (step 220) and a candidate code set to be reassigned is determined (step 222). The candidate code set is determined based on if the updated ISCP of the given timeslot is less than the ISCP threshold, or if the updated timeslot transmitted power is less than the transmitted power threshold after this set of codes is removed from the timeslot which has a link problem. In this determination, both the ISCP threshold and the transmitted power threshold are design parameters. If there is no code set to be reassigned (step 224), then the status flag is set to indicate a failure condition (step 214) and the procedure terminates (step 216).

If there is a code set to be reassigned (step 224), then the available timeslots for the codes to be reassigned are retrieved from the centralized database (step 226). If there are no timeslots available (step 228), then the status flag is set to indicate a failure condition (step 214) and the procedure terminates (step 216). If there are timeslots available (step 228), then the physical channels (timeslots and codes) are allocated for the CCTrCH (step 230).

If the physical channel allocation is not successful (step 232), then the status flag is set to indicate a failure condition (step 214) and the procedure terminates (step 216). If the resource allocation is successful (step 232), then the new physical channel information is recorded in the RRM WTRU database (step 234). The resource allocation (step 232) is considered to be successful only if the optimal solution is found. The physical channel information includes a list of dedicated physical channel timeslot information, a repetition period value, and a repetition length value. The dedicated physical channel timeslot information includes the timeslot number, the midamble shift and burst type, the transport format code indicator (TFCI) presence, and a list of code information. The code information includes the channelized code, the code usage status, the dedicated physical channel (DPCH) identification, and the code SIR target.

The physical channel information is also placed into a physical channel reconfiguration request message (step 236), the status flag is set to indicate a successful allocation (step 238), and the procedure terminates (step 216). The physical channel reconfiguration request message includes the following information: the WTRU identification, the C-RNC identification, the radio link identification, the radio resource control transaction identification, UL CCTrCH information, and DL CCTrCH information.

The step 230 relates to calling the core function of the F-DCA escape procedure to allocate the physical channels. This core function 300 is signal-independent and is described in connection with FIGS. 3a and 3b. The function 300 begins by receiving the code sets, the available timeslots, and an F-DCA type indicator as inputs (step 302). The first code set is selected (step 304) and a determination is made whether the code set is available in the cell (steps 306 and 308). If the selected code set is not available in the cell (step 308), then a determination is made whether there are more code sets to be examined (step 310). If there are more code sets, then the next code set is selected (step 312) and the function continues with step 306. If there are no more code sets (step 310), this indicates a failure condition, and a status flag is set to indicate that no solution is available (step 314) and the function terminates (step 316).

Figure 3A:
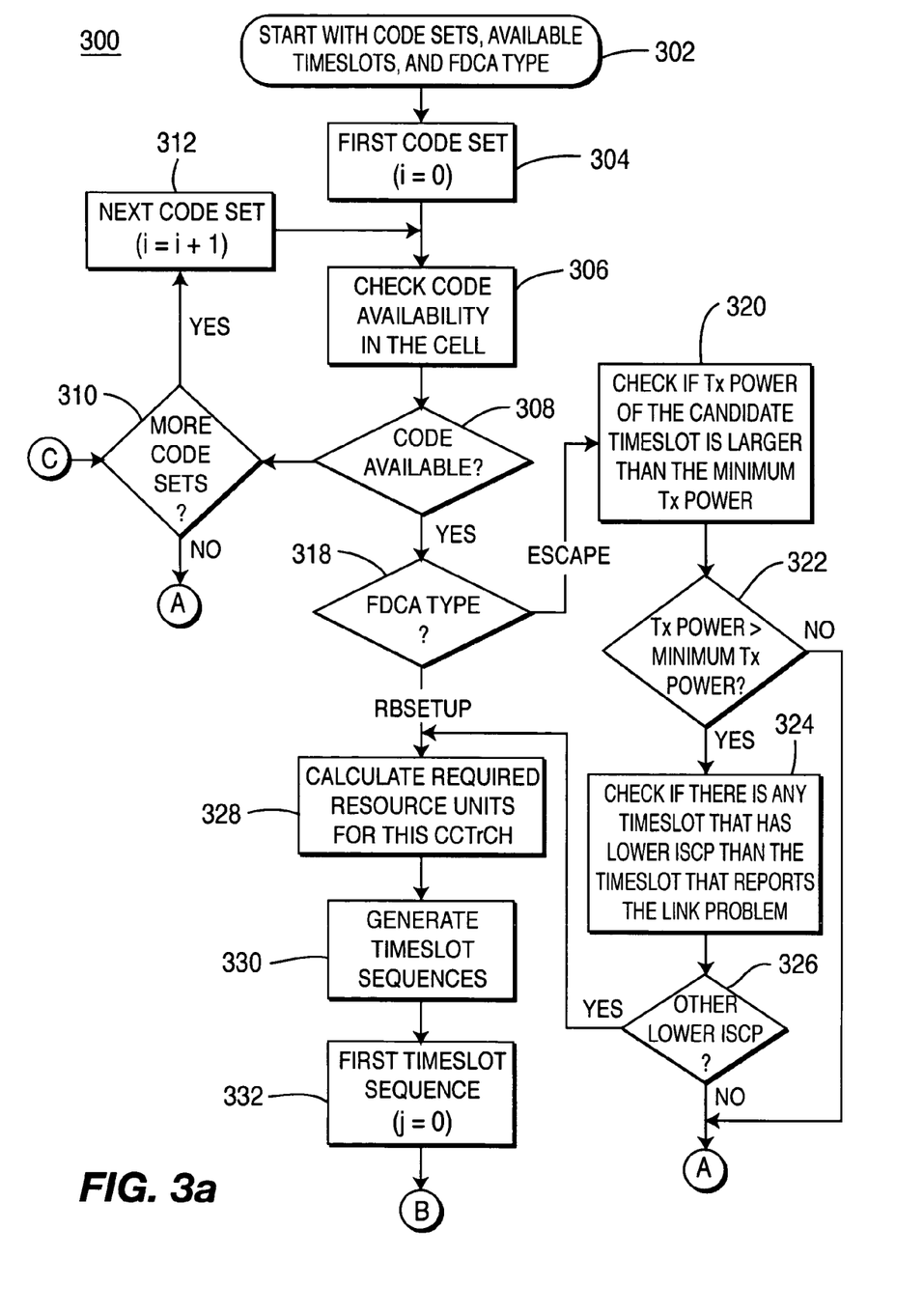
FIGS. 3a and 3b show a flowchart for the channel allocation function for the F-DCA escape procedure shown in FIG. 2.

If the selected code set is available in the cell (step 308), then the F-DCA type is checked (step 318). The F-DCA type is set based on different RRM functions such as radio bearer setup ("RBSETUP"), escape mechanism, or background interference reduction. In the escape procedure, the F-DCA type is set to "ESCAPE," and can be set at any step before step 230 above. If the F-DCA type is "ESCAPE," then the transmission power of the candidate timeslot is checked to determine if it is larger than the minimum required transmission power (step 320). If the candidate timeslot transmission power is less than the minimum value (step 322), then the status flag is set to indicate that no solution is available (step 314) and the function terminates (step 316).

If the candidate timeslot transmission power is greater than the minimum value (step 322), then a check is made to determine if there are any timeslots that have a lower ISCP than the timeslot that reports the link problem (step 324). If there is no other timeslot with a lower ISCP (step 326), then the status flag is set to indicate that no solution is available (step 314) and the function terminates (step 316).

Figure 3B:
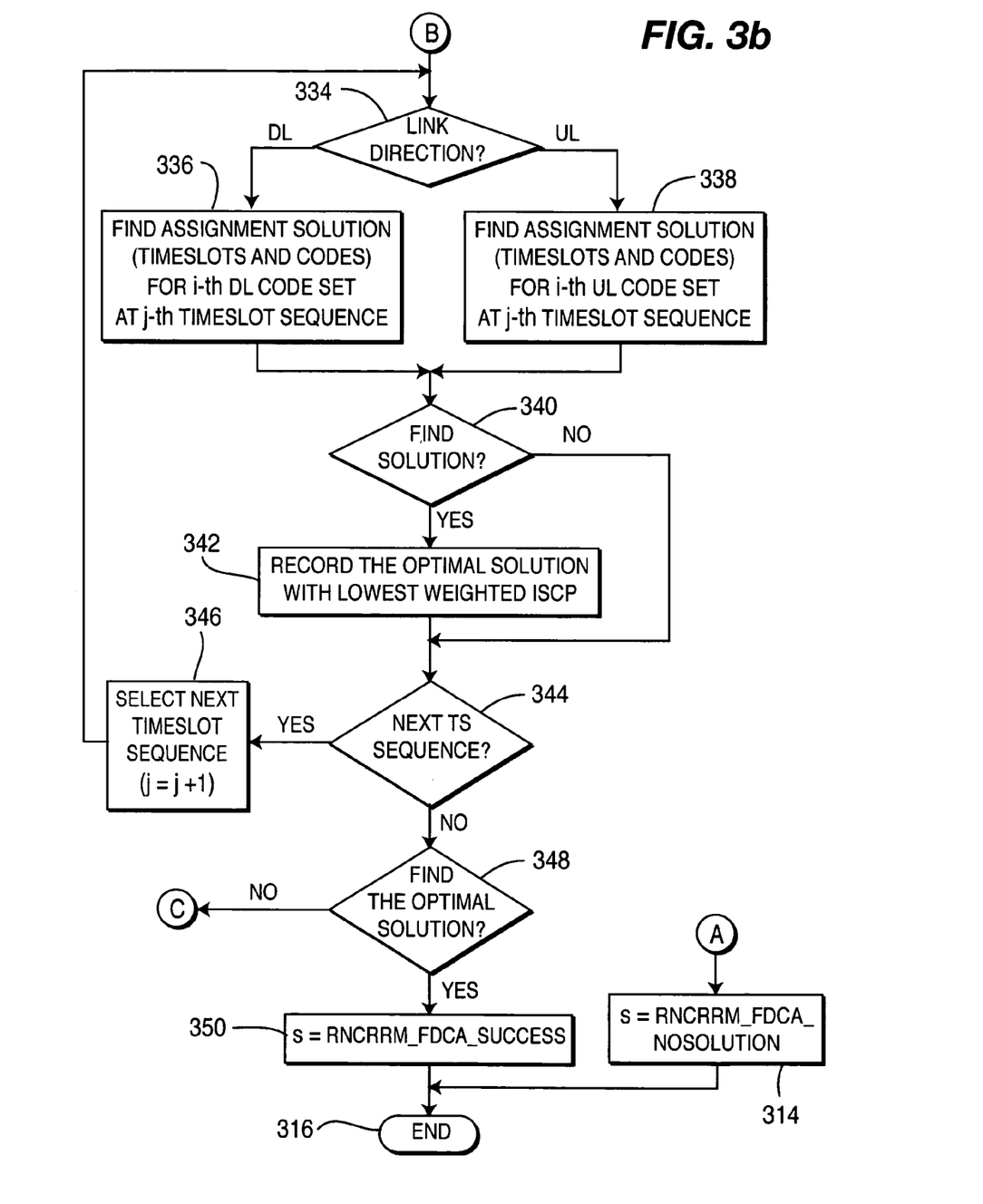

If there is another timeslot with a lower ISCP (step 326) or if the F-DCA type is "RBSETUP" (step 318), then the required resource units for the code set in the CCTrCH are calculated (step 328). The timeslot sequences are generated for the available timeslots (step 330) and the first timeslot sequence is selected (step 332). The link direction, either DL or UL, is then determined (step 334). If the link direction is DL, then an attempt is made to assign the current DL code set into the available timeslots in the current timeslot sequence (step 336). If the link direction is UL (step 334), then an attempt is made to assign the current UL code set into the available timeslots in the current timeslot sequence (step 338). In an alternate embodiment of the present invention (not shown), step 334 can be eliminated and steps 336 and 338 can be combined into a single step, to provide additional optimization.

After an attempt has been made to assign the current code set to the current timeslot sequence (steps 336, 338), a determination is made whether an assignment solution has been found (step 340), indicating that the code set was successfully assigned to the available timeslots in the current timeslot sequence. If a solution has been found, then the ISCP of the solution is determined, and the solution having the lowest weighted ISCP is considered to be the optimal solution and is recorded (step 342). If no solution was found (step 340), then step 342 is skipped.

Next, a determination is made whether there are any additional timeslot sequences to be considered (step 344). If there are additional timeslot sequences, then the next timeslot sequence is selected (step 346) and the function continues with step 334. If there are no additional timeslot sequences (step 344), then a determination is made whether an optimal solution has been found (step 348). If no optimal solution has been found, then the function continues with step 310. If the optimal solution has been found, then the status flag is set to indicate a successful assignment (step 350) and the function terminates (step 316).

In previous implementations of the F-DCA CAC algorithm, the functions 336 and 338 are signal-dependent. In the present invention, these two functions are modified to become signal-independent functions. All related functions used in these two functions are also modified to become signal-independent functions. Because the inputs of the functions 336 and 338 are independent of the signal message, the functions 336 and 338 can be used by other RRM procedures.

It is noted that the above-described implementation of the F-DCA escape mechanism is exemplary and can be further optimized. For example, as discussed above, the steps 336 and 338 can be combined into a single step, and step 334 can be eliminated. Although the preferred embodiments are described in conjunction with a third generation partnership program (3GPP) wideband code division multiple access (W-CDMA) system utilizing the time division duplex (TDD) mode, the embodiments are applicable to any hybrid code division multiple access (CDMA)/time division multiple access (TDMA) communication system. Additionally, some embodiments are applicable to CDMA systems, in general, using beamforming, such as the proposed frequency division duplex (FDD) mode of 3GPP W-CDMA. While specific embodiments of the present invention have been shown and described, many modifications and variations could be made by one skilled in the art without departing from the scope of the invention. The above description serves to illustrate and not limit the particular invention in any way.

What is claimed is:
1. A method of implementing a fast dynamic channel allocation escape procedure in a wireless communication system, comprising:
   a pre-code allocation procedure;
   a signal-independent code allocation procedure, including:
      checking the availability of a code set in the cell;
      checking the transmission power of a candidate timeslot;

checking if the interference signal code power (ISCP) for other timeslots is lower than the ISCP of the candidate timeslot;

generating timeslot sequences for the available timeslots;

assigning a code set to the available timeslots in a timeslot sequence, wherein a successful assignment is a solution;

calculating the ISCP for each solution; and selecting the solution having the lowest weighted ISCP as an optimal solution; and a post-code allocation procedure.

2. The method according to claim 1, wherein the pre-code allocation procedure includes:

receiving a trigger signal;

obtaining wireless transmit/receive unit (WTRU) measurements and Node B measurements;

retrieving cell configuration information and WTRU information from a centralized database;

determining a candidate coded composite transport channel to be reassigned;

determining a candidate code set to be reassigned; and obtaining a list of the available timeslots from the centralized database.

3. The method according to claim 1, wherein the post-code allocation procedure includes:

storing new allocation information in a centralized database; and creating a physical channel reconfiguration request message.

4. A method of implementing a fast dynamic channel allocation escape procedure in a wireless communication system, comprising the steps of:

receiving a trigger signal to initiate the escape procedure;

processing the trigger signal;

retrieving wireless transmit/receive unit (WTRU) measurements from a centralized database;

retrieving Node B measurements from the centralized database;

determining physical resources to be reassigned;

retrieving a list of available timeslots from the centralized database;

retrieving WTRU capability information from the centralized database;

allocating a code set to the available timeslots in a timeslot sequence;

storing the allocation information in the centralized database; and sending a physical channel reconfiguration request message containing the allocation information.

5. The method according to claim 4, wherein the WTRU measurements include downlink interference signal code power.

6. The method according to claim 4, wherein the Node B measurements include:

common measurements, including uplink interference signal code power and downlink transmitted carrier power; and dedicated measurements, including downlink transmitted code power.

7. The method according to claim 4, wherein the determining step includes:

determining a candidate coded composite transport channel (CCTrCH) to be reassigned;

determining a candidate code set to be reassigned; and retrieving a list of available timeslots to be reassigned.

8. The method according to claim 7, wherein the candidate CCTrCH to be reassigned is determined by how the escape procedure is triggered.

9. The method according to claim 8, wherein the escape procedure is triggered by a too high downlink (DL) interference signal code power (ISCP) of a WTRU in a timeslot, the DL ISCP being contained in the WTRU measurements; and the candidate CCTrCH is the CCTrCH of the WTRU in the timeslot.

10. The method according to claim 8, wherein the escape procedure is triggered by a too high uplink (UL) interference signal code power (ISCP) in a timeslot, the UL ISCP being contained in the Node B measurements; and the candidate CCTrCH is the CCTrCH having the code with the highest value of signal to interference ratio target plus pathloss.

11. The method according to claim 8, wherein the escape procedure is triggered by a too high Node B transmitted carrier power in a timeslot, contained in the Node B measurements; and the candidate CCTrCH is the CCTrCH having the code with the highest Node B transmitted code power.

12. The method according to claim 7, wherein the candidate code set is determined based on if the updated ISCP of the given timeslot is less than the ISCP threshold, or if the updated timeslot transmitted power is less than the transmitted power threshold after this set of codes is removed from the timeslot which has a link problem.

13. The method according to claim 4, wherein the WTRU capability information includes:

the uplink WTRU capability information; and the downlink WTRU capability information.

14. The method according to claim 13, wherein the uplink WTRU capability information includes:

the maximum number of uplink timeslots per frame; and the maximum number of uplink physical channels per time slot.

15. The method according to claim 13, wherein the downlink WTRU capability information includes:

the maximum number of downlink time slots per frame; and the maximum number of downlink physical channels per frame.

16. The method according to claim 4, wherein the allocating step includes:

checking the availability of a code set in the cell;

checking the transmission power of a candidate timeslot;

checking if the interference signal code power (ISCP) for other timeslots is lower than that of the candidate timeslot;

generating timeslot sequences from the list of available timeslots; and assigning a code set to the available timeslots in a timeslot sequence to find a solution, wherein a successful assignment is a solution.

17. The method according to claim 16, wherein the allocating step further includes:

calculating an ISCP value for each solution; and selecting the solution having the lowest weighted ISCP value as an optimal solution.

18. The method according to claim 4, wherein the storing step includes recording physical channel information in the centralized database.

19. The method according to claim 18, wherein the physical channel information includes:
dedicated physical channel timeslot information;
a repetition period value; and
a repetition length value.

20. The method according to claim 19, wherein the dedicated physical channel timeslot information includes:
the timeslot number;
a midamble shift and burst type;
a transport format combination indicator presence; and
code information.

21. The method according to claim 20, wherein the code information includes:
a channelized code;
a code usage status;
a dedicated physical channel identification; and
a code signal to interference target.

22. The method according to claim 4, wherein the sending step includes filling the physical channel reconfiguration request message.

23. The method according to claim 22, wherein physical channel reconfiguration request message includes:
the WTRU identification;
a controlling radio network controller identification;
a radio link identification;
a radio resource control transaction identification;
uplink coded composite transport channel (CCTrCH) information; and
downlink CCTrCH information.

24. The method according to claim 23, wherein the CCTrCH information includes dedicated physical channel (DPCH) information.

25. The method according to claim 24, wherein the DPCH information includes DPCH timeslot information.

26. The method according to claim 25, wherein the DPCH timeslot information includes:
the timeslot number;
the midamble shift and burst type;
the transport format combination indicator presence; and
the code information.

27. The method according to claim 26, wherein the code information includes:
the DPCH identification; and
the channelization code.

* * * * *

UNITED STATES PATENT AND TRADEMARK OFFICE
CERTIFICATE OF CORRECTION

| | |
|---|---|
| PATENT NO. | : 7,212,826 B2 |
| APPLICATION NO. | : 10/747733 |
| DATED | : May 1, 2007 |
| INVENTOR(S) | : Xiaochun Xu Fisher |

Page 1 of 1

It is certified that error appears in the above-identified patent and that said Letters Patent is hereby corrected as shown below:

ON THE TITLE PAGE

At Item (56), U.S. PATENT DOCUMENTS, page 1, right column, delete line 5, "2001/0038623   A1   11/2001   Van Lieshout et al.".

Signed and Sealed this

Fourteenth Day of August, 2007

JON W. DUDAS
*Director of the United States Patent and Trademark Office*